United States Patent [19]

Boyer et al.

[11] Patent Number: 4,809,027

[45] Date of Patent: Feb. 28, 1989

[54] OFFSET ELECTROSTATIC PRINTING UTILIZING A HEATED AIR FLOW

[75] Inventors: Alan H. Boyer, East Sullivan; Graham D. Walter, Peterborough; Robert A. Moore, Amberst, all of N.H.

[73] Assignee: Markem Corporation, Keene, N.H.

[21] Appl. No.: 890,304

[22] Filed: Jul. 29, 1986

[51] Int. Cl.[4] .................... G01D 5/00

[52] U.S. Cl. .................... 346/159; 346/155

[58] Field of Search .................... 346/153.1, 155, 154; 355/30; 34/46, 56; 214/216; 101/DIG. 13; 400/119; 358/300; 250/423 R, 423 P, 423 F; 165/14, 16, 21, 36, 3

[56] References Cited

U.S. PATENT DOCUMENTS

| | | | |
|---|---|---|---|
| 2,225,247 | 12/1940 | Kline et al. | 346/159 |
| 2,868,989 | 1/1959 | Haacke | 346/159 |
| 2,885,556 | 5/1959 | Gundlach | 346/15 |
| 2,931,688 | 4/1960 | Innes et al. . | |
| 3,023,070 | 2/1962 | Benn . | |
| 3,195,142 | 7/1965 | Benn et al. . | |
| 3,213,461 | 10/1965 | Goddard | 346/159 |
| 3,324,291 | 6/1967 | Hudson | 346/159 |
| 3,382,360 | 5/1968 | Young et al. . | |
| 3,495,269 | 2/1970 | Mutschler et al. . | |
| 3,496,352 | 2/1970 | Jugle | 346/159 |
| 3,545,374 | 12/1970 | Hendricks, Jr. | 346/159 |
| 3,606,531 | 9/1971 | Gourdine | 346/159 |
| 3,646,351 | 2/1972 | Jarvis | 346/159 |
| 3,665,181 | 5/1972 | Cobb | 346/159 |
| 3,689,935 | 9/1972 | Pressman et al. | 346/159 |
| 3,715,762 | 2/1973 | Magill et al. . | |
| 3,725,951 | 4/1973 | McCurry | 346/159 |
| 3,742,516 | 6/1973 | Cavanaugh et al. | 346/159 |
| 3,779,166 | 12/1973 | Pressman et al. | 346/159 |
| 3,862,420 | 1/1975 | Banks et al. | 346/159 |
| 3,878,469 | 4/1975 | Bolasny | 346/159 |
| 3,978,492 | 8/1976 | Simm . | |
| 3,979,759 | 9/1976 | Simm . | |
| 4,016,813 | 4/1977 | Pressman et al. | 346/159 |
| 4,030,106 | 6/1977 | Bestenreiner et al. . | |
| 4,040,731 | 8/1977 | Nishikawa | 355/30 |
| 4,050,377 | 9/1977 | Watanabe et al. | 346/159 |
| 4,057,723 | 11/1977 | Sarid et al. | 346/159 |
| 4,105,444 | 8/1978 | Shinohara et al. | 346/159 |
| 4,110,614 | 8/1978 | Sarid et al. | 346/159 |
| 4,117,778 | 10/1978 | Watanabe et al. . | |
| 4,124,854 | 11/1978 | Kirtikar | 346/15 |
| 4,152,747 | 5/1979 | Fisher | 346/159 |
| 4,160,257 | 7/1979 | Carrish | 346/159 |
| 4,338,614 | 7/1982 | Pressman et al. | 346/159 |
| 4,353,970 | 10/1982 | Dryczynski et al. . | |
| 4,357,618 | 11/1982 | Ragland | 346/159 |
| 4,365,549 | 12/1982 | Fotland et al. | 346/159 |
| 4,408,214 | 10/1983 | Fotland et al. | 346/159 |
| 4,409,604 | 10/1983 | Fotland | 346/159 |
| 4,446,371 | 5/1984 | Cobb | 346/159 |
| 4,463,363 | 7/1984 | Gundlach et al. | 346/159 |
| 4,591,885 | 5/1986 | Day et al. | 346/159 |
| 4,619,515 | 10/1986 | Maczuszenko et al. | 346/159 |

FOREIGN PATENT DOCUMENTS

| | | | |
|---|---|---|---|
| 53-125839 | 11/1978 | Japan | 346/159 |
| 53-136830 | 11/1978 | Japan | 346/159 |
| 59-204055 | 11/1984 | Japan | 346/159 |
| 1309449 | 3/1973 | United Kingdom | 346/159 |
| 1309664 | 3/1973 | United Kingdom | 346/159 |

OTHER PUBLICATIONS

*Patent Abstracts of Japan*, vol. 8, No. 157, p-288, 1594 (Jul. 20, 1984).

(List continued on next page.)

*Primary Examiner*—Arthur G. Evans

*Attorney, Agent, or Firm*—Robbins & Laramie

[57] ABSTRACT

An offset electrostatic printer is disclosed which comprises (a) an ion modulated electrostatic print head for forming latent electrostatic images, (b) a dielectric imaging member comprising a layer of dielectric material, (c) means for developing a latent electrostatic image on the dielectric imaging member, (d) means for transferring a developed electrostatic image from the dielectric imaging member to an image receiving surface, (e) means for supplying a flow of heated air having a temperature in the range of from about 120° F. (49° C.) to about 200° F. (93° C.), and (f) means for directing the flow of heated air at, near or through the print head and at or near the dielectric imaging member. The flow of heated air reduces the accumulation of chemical deposits in the print head.

14 Claims, 8 Drawing Sheets

OTHER PUBLICATIONS

R. J. Chadwell et al., "Control of Photoconductor Environment", *IBM Technical Disclosure Bulletin,* vol. 19, No. 2, p. 392 (Jul. 1976).

*Patent Abstracts of Japan,* vol. 9, No. 243 p-392, 1966 (Sep. 30, 1985).

*Patent Abstracts of Japan,* vol. 8, No. 163, p-290, 1600 (Jul. 27, 1984).

*Patent Abstracts of Japan,* vol. 10, No. 26, p-425, 2083 (Jan. 31, 1986).

J. W. Laing, "The Ion Chemistry of Corona Discharges in Air", Annual Reprographic Conference on Electrical Insulation and Dielectric Phenomena, Oct. 21-24, 1979.

W. J. Bernardelli et al., "Corona Contamination Reduction", *IBM Technical Disclosure Bulletin,* vol. 23, No. 9, pp. 4037-4038 (Feb. 1981).

J. M. Adley et al., "Corona Design with Ozone Ducts", *IBM Technical Disclosure Bulletin,* vol. 26, No. 3A, p. 1024 (Aug. 1983).

R. E. McCurray, "Direct Ionic Printer-Plotter", *IBM Technical Disclosure Bulletin,* vol. 15, No. 1, p. 275 (Jun. 1972).

H. B. Dean, "Corona Apparatus", *IBM Technical Disclosure Bulletin,* vol. 17, No. 9, p. 2745 (Feb. 1975).

G. L. Harpavat et al., "Arrangement for Preventing Dirt Accumulation on Corona Discharge Devices", *Xerox Disclosure Journal,* vol. 1, No. 3, p. 57 (Mar. 1976).

R. R. Thettu et al., "Corona Device with Reduced Ozone Emission", *Xerox Disclosure Journal,* vol. 1, No. 3, p. 59 (Mar. 1976).

T. J. Hammond et al., "Corona Device", *Xerox Disclosure Journal,* vol. 1, No. 3, p. 61 (Mar. 1976).

C. D. Wilson, "Air Conditioning of Xerographic Reproduction Machines", *Xerox Disclosure Journal,* vol. 1, No. 7, p. 69 (Jul. 1976).

FIG. 2
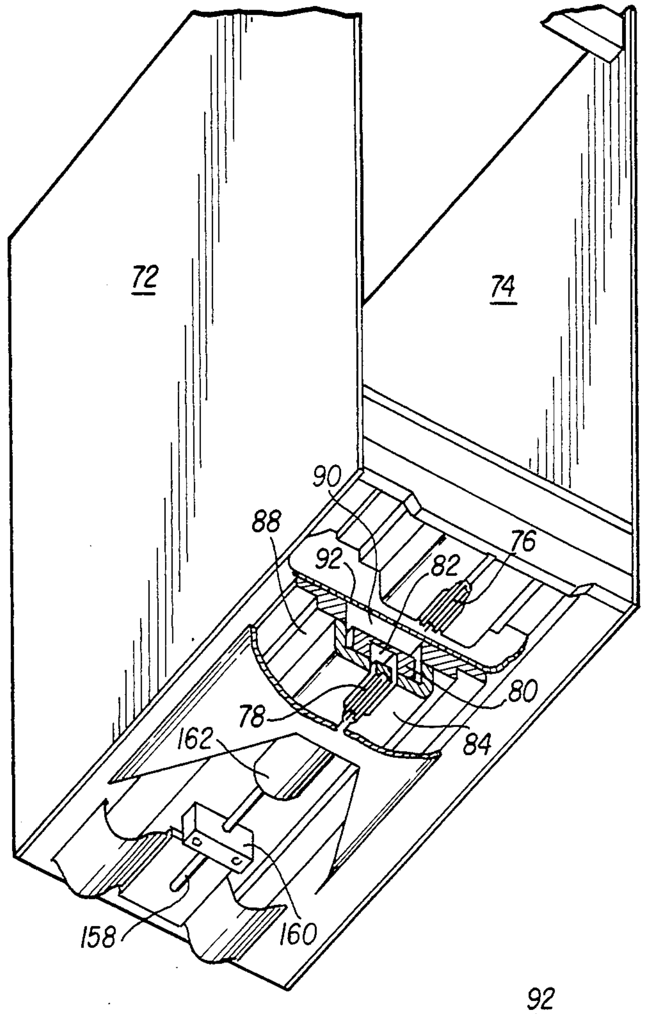
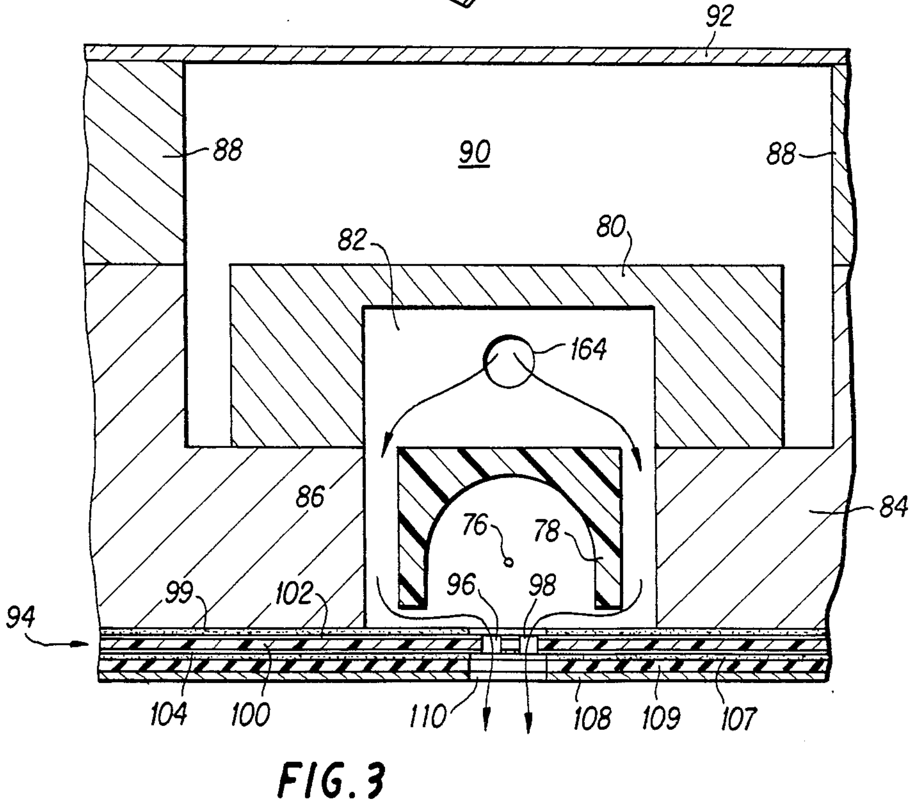
FIG. 3

OFFSET ELECTROSTATIC PRINTING UTILIZING A HEATED AIR FLOW

BACKGROUND OF THE INVENTION

1. Field of the Invention

The present invention relates generally to an offset electrostatic printer which utilizes heated air to extend the lifetimes of the print head and of the dielectric imaging member and to an offset electrostatic imaging process involving the utilization of heated air.

2. Description of the Prior Art

In a typical electrostatic imaging process, a latent electrostatic image is formed on a dielectric charge retentive surface using a non-optical means, such as an electrostatic print head which generates ions by the corona discharge from a small diameter wire or point source. The dielectric surface can be either on the final image recording or receiving medium or on an intermediate transfer element, such as a cylindrical drum.

The latent electrostatic image is then developed by depositing a developer material containing oppositely charged toner particles. The toner particles are attracted to the oppositely charged latent electrostatic image on the dielectric surface. If the dielectric surface is on the final recording medium, then the developed image can be fixed by applying heat and/or pressure. If the dielectric surface is on an intermediate transfer element, however, then the developed image must first be transferred to the final recording medium, for example plain paper, and then fixed by the application of heat and/or pressure. Alternatively, the developed image may be fixed to the final recording medium by means of the high pressure applied between the dielectric-coated transfer element and a pressure roller, between which the final recording medium passes.

The intermediate transfer element in an offset electrostatic imaging process is typically a cylindrical drum made from an electrically conductive, non-magnetic material, such as aluminum or stainless steel, which is coated with a dielectric material. Suitable dielectric materials include polymers, such as polyesters, polyamides, and other insulating polymers, glass enamel, and aluminum oxide, particularly anodized aluminum oxide. Dielectric materials such as aluminum oxide are preferred to layers of polymers because they are much harder, and therefore, are not as readily abraded by the developer materials and the high pressure being applied. Metal oxide layers prepared by a plasma spraying or detonation gun deposition process have been particularly preferred as dielectric layers because they are harder and exhibit longer lifetimes than layers prepared using other processes.

One major problem encountered with currently available electrostatic printers of the ion deposition screen type has been the limited lifetime of the electrostatic aperture board. These types of electrostatic printers are disclosed in U.S. Pat. Nos. 3,689,935, 4,338,614 and 4,160,257. Such electrostatic printers have a row of apertures which selectively allow ionized air to be deposited onto a dielectric surface in an imagewise dot matrix pattern. It has been observed that a chemical debris tends to build up around the apertures and on the corona wire as a function of time and the humidity of the air. This chemical debris was found to be a crystalline form of ammonium nitrate. This particular chemical is created when air containing water molecules, such as is generally encountered, is ionized.

It has also been observed that, when an electrostatic printer of the type disclosed in U.S. Pat. No. 4,365,549 is operated in a moderately high relative humidity, the surface conductivity of the dielectric drum increases where the ionized water molecules are deposited. The ionized water molecules are complexes containing hydronium ions. Water molecules in the air can become ionized by the corona wire in the ion deposition print head or by the A.C. scorotrons which are used to discharge residual charge on the drum. These conductive areas are observed on the final recording medium as weakly developed areas. This is believed to be caused by the more conductive surfaces leaking off their latent electrostatic images to the toner which has been made conductive during the development operation.

A number of methods have been suggested for alleviation of this problem of contaminant buildup. It has been suggested that the air being supplied to the corona discharge device first be filtered through a filter for ammonia in order to prevent the formation of ammonium nitrate. This method has not been found to be effective because it does not remove the water molecules in the air which under the influence of a corona discharge and in combination with other components of air form precursors to ammonium nitrate. Another method suggested for inhibiting formation of ammonium nitrate in an ion generator which includes a glow discharge device is to heat the glow discharge device above its intrinsic operating temperature at or near the ion generation sites.

SUMMARY OF THE INVENTION

In accordance with the present invention, the operational lifetime of an offset electrostatic printer can be prolonged by an order of magnitude by passing heated air at, near or through the ion modulated print head of the printer and at or near the surface of the dielectric imaging member.

An electrostatic printer in accordance with the present invention comprises an ion modulated electrostatic print head for forming latent electrostatic images, a dielectric imaging member comprising a layer of dielectric material, means for developing a latent electrostatic image on the dielectric imaging member, means for transferring a developed electrostatic image from the dielectric imaging member to an image, means for supplying heated air having a temperature in the range of from about 120° F. (49° C.) to about 200° F. (93° C.), and preferably, from about 140° F. (60° C.) to about 180° F. (82° C.), and means for directing the heated air at, near or through the print head and at or near the dielectric imaging member. In a preferred embodiment, the print head comprises a modulated aperture board having a plurality of selectively controlled apertures therein and an ion generator for projecting ions through the apertures. In this embodiment, the heated air is directed at or near the ion generator and at, near or through the apertures. The offset electrostatic printer may further comprise an ion generator for erasing latent electrostatic images, and a means for directing heated air at or near such ion generator. In the absence of the heated air, the ion generators normally operate at or near ambient temperature.

The process of the present invention comprises the steps of forming a latent electrostatic image on a dielectric imaging member using an electrostatic print head, developing the latent electrostatic image, transferring the developed electrostatic image from the dielectric imaging member to an image receiving surface, providing heated air, and directing it at, near or through the print head and at or near the dielectric imaging member. The process may further comprise the steps of erasing the latent electrostatic images by means of an ion generator and directing the heated air at or near such ion generator.

With heated air having a temperature in the range of from about 120° F. (49° C.) to about 200° F. (93° C.), and preferably from about 140° F. (60° C.) to about 180° F. (82° C.), the lifetime of the offset electrostatic printer can be extended significantly. It has been found that the use of such heated air substantially inhibits the formation of ammonium nitrate around the ion generators, the apertures and the dielectric imaging member. Although the mechanism by which the hot air enhances the print head performance is not completely understood, it is believed that the combination of heat and flowing air is important. Ammonium nitrate is known to be thermally unstable, i.e. it decomposes when heated to form nitrous oxide and water. The effect of heat is to decompose any ammonium nitrate that has been formed and the flow of the heated air serves to exhaust the gaseous by products of this decomposition. The presence of heated flowing air is also believed to inhibit the initial formation of ammonium nitrate. Since the amount of a product which is formed from gaseous reactants is dependent upon both the concentration of the reactants and also upon the time allowed for them to react, the presence of hot flowing air serves to maintain at a low concentration any gaseous precursors which might combine to form ammonium nitrate and also to decrease the amount of time that they spend in the area of the ion generator and the apertures. The use of heated air also reduces oxidation of the electrodes used to control the apertures, and provides for more uniform deposition of ions across the print head. In addition, the use of heated air improves the retention of the latent electrostatic images on the dielectric imaging member.

BRIEF DESCRIPTION OF THE DRAWINGS

The various objects, advantages and novel features of the invention will be fully appreciated from the following detailed description when read in conjunction with the appended drawings, in which:

FIG. 2 is a perspective view of the electrostatic print head, with portions cut away to illustrate certain internal details;

FIG. 3 is an enlarged sectional view of the corona wire and aperture mask assembly of the print head;

Throughout the drawings, like reference numerals will be used to identify like parts.

DETAILED DESCRIPTION OF THE PREFERRED EMBODIMENTS

Figure 1:
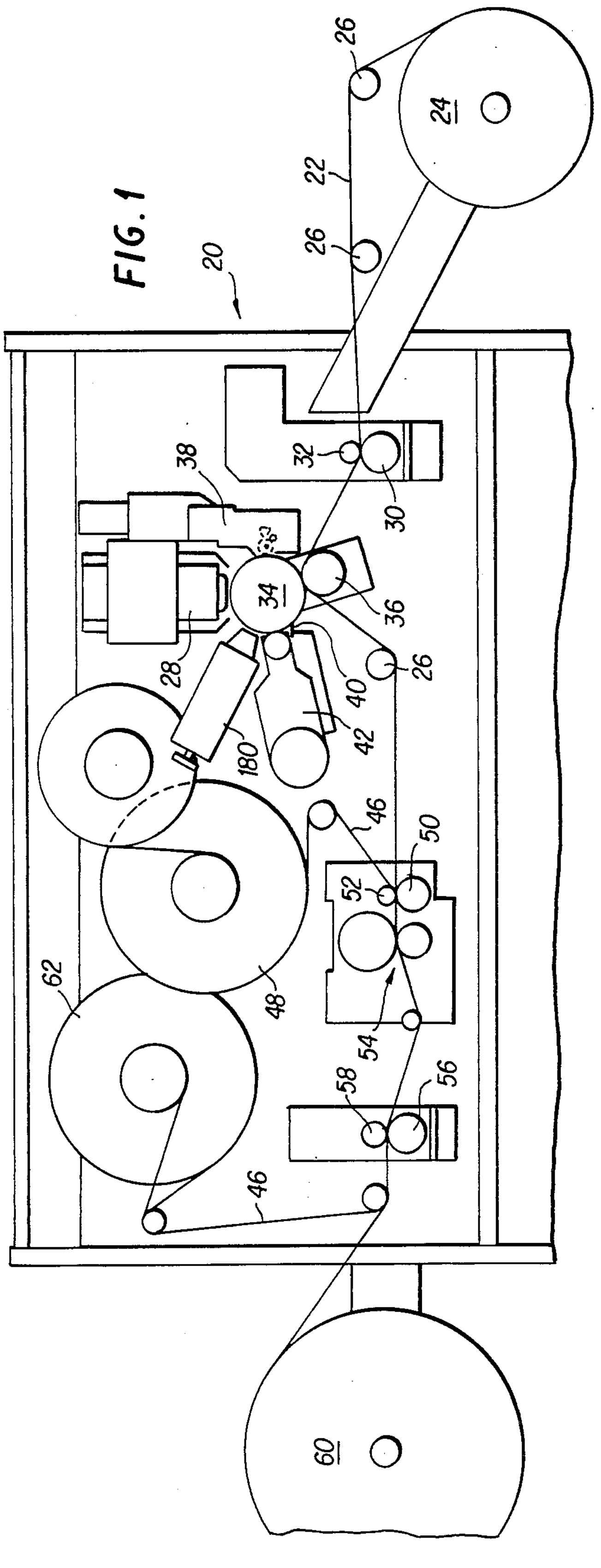
FIG. 1 illustrates an offset electrostatic printing system in which the present invention may be employed.
Figure 5:
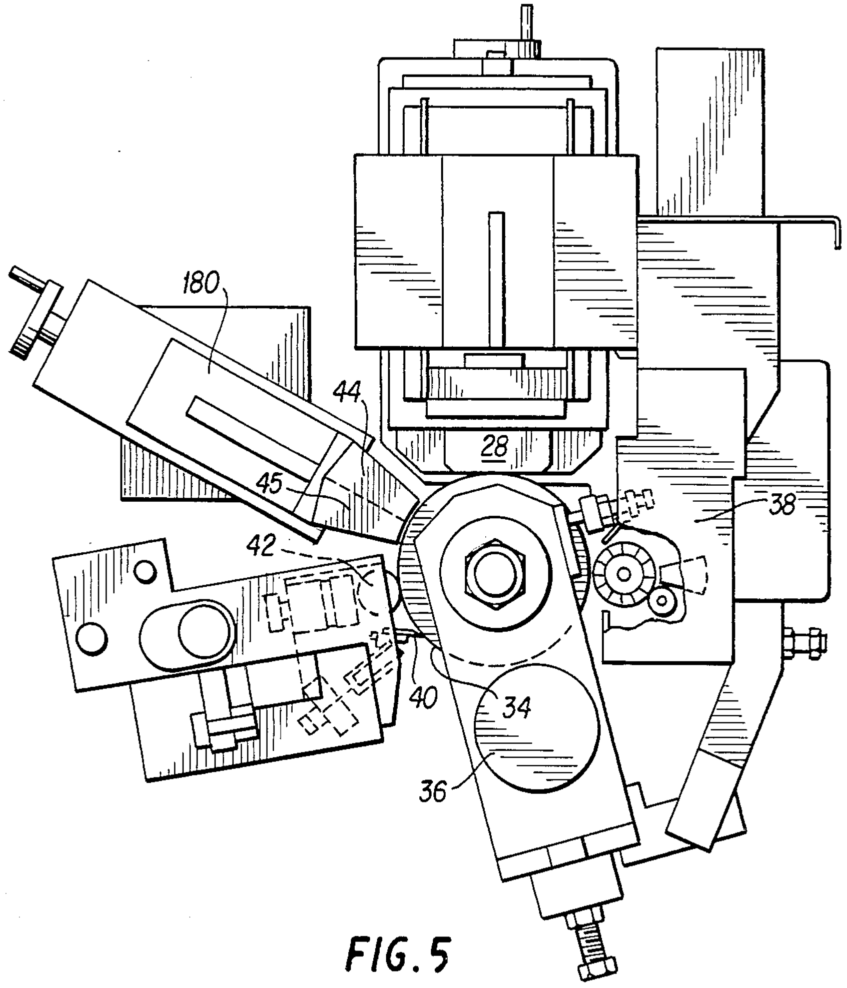
FIG. 5 is an enlarged view of the area around the dielectric drum of the offset electrostatic printing system illustrated in FIG. 1.

FIG. 1 illustrates an offset electrostatic label printing system 20 which may advantageously be used to practice the process of the present invention. A web 22 of plain paper is fed from a supply reel 24 and is carried by a number of guide wheels 26 through a brake roll nip formed by rolls 30 and 32 and then between dielectric drum 34 and backup roll 36. A latent electrostatic image is formed on dielectric drum 34 which has been prepared by coating a conductive substrate with a metal oxide laye using a plasma spraying or detonation gun deposition process. The latent electrostatic image is formed by means of an ion modulated electrostatic print head 28 as the drum 34 rotates. The latent image is developed on the drum 34 by the developer unit 38, and the developed image is then transferred to the paper web 22 and simultaneously pressure-fixed thereon at the nip between the drum 34 and the backup roll 36. A doctor blade 40 is provided to scrap off the developer material residue followed by cleaning of the dielectric layer with web cleaner 42. Any latent electrostatic images remaining on the drum are then erased by corona neutralizer unit 180 in preparation for subsequent printing cycles. An enlarged view of the area around the dielectric drum 34 is shown in FIG. 5.

A web 46 of overlaminate material is fed from supply reel 48 through a nip formed by rolls 50 and 52 where it is applied over the printed image on web 22. The overlaminated printed web is then cut into finished labels by rotary die cutting station 54 and passed through a drive roll nip formed by rolls 56 and 58. The finished labels are wound onto rewind reel 60 and the cut-out overlaminate web 46 is wound onto waste rewind reel 62.

Figure 4:
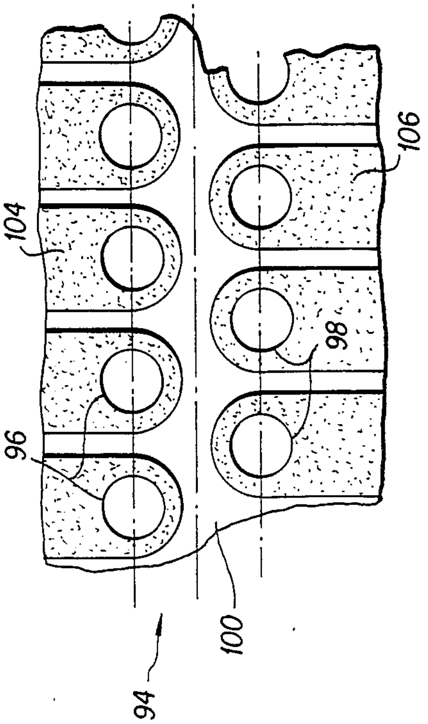
FIG. 4 is a still further enlarged view of the aperture electrodes carried by the aperture mask.

FIG. 2 is a perspective view of the electrostatic print head 28 with portions cut away to illustrate certain internal details. FIG. 3 is an enlarged sectional view of the corona wire and aperture mask assembly of the print head, and FIG. 4 is a still further enlarged view of the aperture electrodes carried by the aperture mask. The print head 28 is of the type disclosed and claimed in U.S. Pat. No. 3,689,935, issued to Gerald L. Pressman et al. on Sept. 5, 1972 and U.S. Pat. No. 4,016,813, issued to Gerald L. Pressman et al. on Apr. 12, 1977, both of these patents being expressly incorporated herein by reference. The print head 28 also embodies certain improvements disclosed and claimed in U.S. Pat. No. 4,338,614, issued to Gerald L. Pressman et al. on July 6, 1982 and also incorporated herein by reference.

The print head 28 of FIG. 2 generally comprises a pair of electrical circuit boards 72, 74 mounted on either side of a centrally-located corona wire and aperture mask assembly. The corona wire 76 is enclosed within an elongated conductive corona shield 78 which has U-shaped cross-section. Th corona shield 78 is supported at each of its two ends by a manifold block 80 that is formed with an oblong central cavity 82. The manifold block 80 is nested within a mask support block 84 which is generally C-shaped in cross-section. The mask support block 84 is formed with an oblong central opening 86 which registers with the cavity 82 is the manifold block 80 and receives the corona shield 78. The mask support block 84 is secured at its edge to a print head slider 88, the latter being the primary supporting structure of the print head 28 and carrying the two circuit boards 72, 74. The print head slider 88 is formed with a large central cut-out 90 and is secured to driver board 92.

The corona shield 78 is positioned in facing relationship with an aperture mask formed by a flexible circuit board 94. Referring particularly to FIGS. 3 and 4, the circuit board 94 is formed with two staggered rows of apertures 96, 98 extending parallel to the corona wire 76 and transverse to the direction of movement of the web 22 in FIG. 1. Positive ions produced by the corona wire 76, which is maintained at a positive DC potential of about 2.7 kilovolts, are induced to pass through the apertures 96, 98 under the influence of an accelerating potential which is maintained between the corona wire 76 and the conductive core of the drum 34 of FIG. 1. The flexible circuit board 94 includes a central insulating layer 100 and carries a continuous conductive layer 102 on the side facing the corona wire 76. The opposite side of the insulating layer 100 carries a number of conductive segments 104, 106 associated with the individual apertures 96, 98 as shown in FIG. 4. Circuit board 94 is secured to mask support block 84 by a thin layer of adhesive 99 and to slotted focus plane 108 by an insulating adhesive layer 109. Circuit board 94 is overlaminated with a thin insulating layer 107. In operation, individual potentials are applied between the conductive segments 104, 106 and the continuous conductive layer 102 in order to establish local fringing fields within the apertures 96, 98. As described in the aforementioned U.S. Pat. Nos. 3,689,935 and 4,016,813, these fringing fields can be used to block or permit the flow of ions from the corona wire 76 to the drum 34 of FIG. 1 through selected ones of the apertures 96, 98. The apertures are controlled by appropriate electronics carried by the circuit boards 72, 74. As explained in the aforementioned U.S. Pat. No. 4,338,614, the performance of the print head may be enhanced by interposing a slotted focus plane made of a conductive material between the modulated apertures 96, 98 and the dielectric-coated drum 34. The slotted focus plane is illustrated at 108 in FIG. 3, with the slot 110 aligned with the aperture rows 96, 98.

In an alternative embodiment, the corona wire 76 may consist of a dielectric-coated conductor using a high-frequency AC voltage source. Ion generators of this type generate both positive and negative ions, although only one type of ion (in this case positive) is drawn through the apertures 96, 98 by the DC accelerating potential existing between the corona wire and the drum 34. Dielectric-coated AC corona devices are described in U.S. Pat. No. 4,057,723, issued to Dror Sarid et al. on Nov. 8, 1977; U.S. Pat. No. 4,110,614, issued to Dror Sarid et al. on Aug. 29, 1978; U.S. Pat. No. 4,409,604, issued to Richard A. Fotland on Oct. 11, 1983; and U.S. Pat. No. 4,446,371, issued to Harold W. Cobb on May 1, 1984. The foregoing patents are expressly incorporated by reference herein.

In practice, it has been found that deposits of ammonium nitrate form in and around the apertures 96, 98, principally on the side facing the corona wire 76. Some deposits also form on the corona wire itself, thereby reducing its output and producing a nonuniform corona. After the print head has been in operation with an unheated air flow for about 50–75 hours, the deposits of ammonium nitrite in and around the apertures 96, 98 begin to restrict the flow of ions through the apertures. The effect on output can be counteracted somewhat by increasing the potential on the corona wire 76, but eventually a point is reached at which the apertures become substantially completely blocked. When this occurs, the print head 28 must be removed from the printing apparatus and the flexible circuit board 94 carrying the apertures 96, 98 must be replaced or cleaned. The flexible circuit board 94 is rather difficult and expensive to manufacture, since it must be etched with a pattern of fine, closely-spaced conductors for controlling the individual apertures. Therefore, frequent replacement of this component is undesirable. Frequent cleaning is also undesirable because there is the possibility of damaging the delicate circuit and because it is time consuming.

Figure 6:
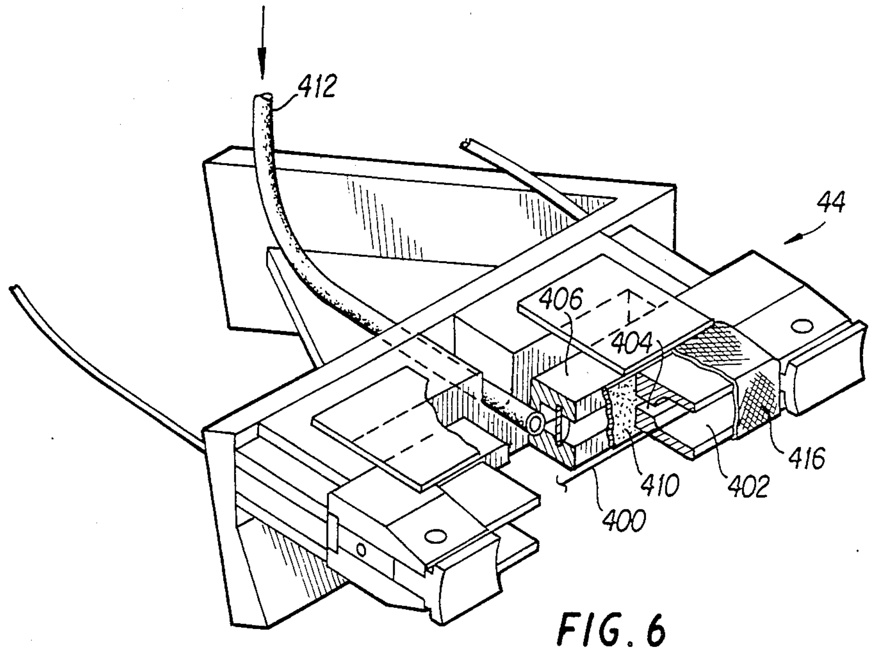
FIG. 6 is a perspective view of a corona neutralizer, with portions cut away to illustrate certain internal details.
Figure 7:
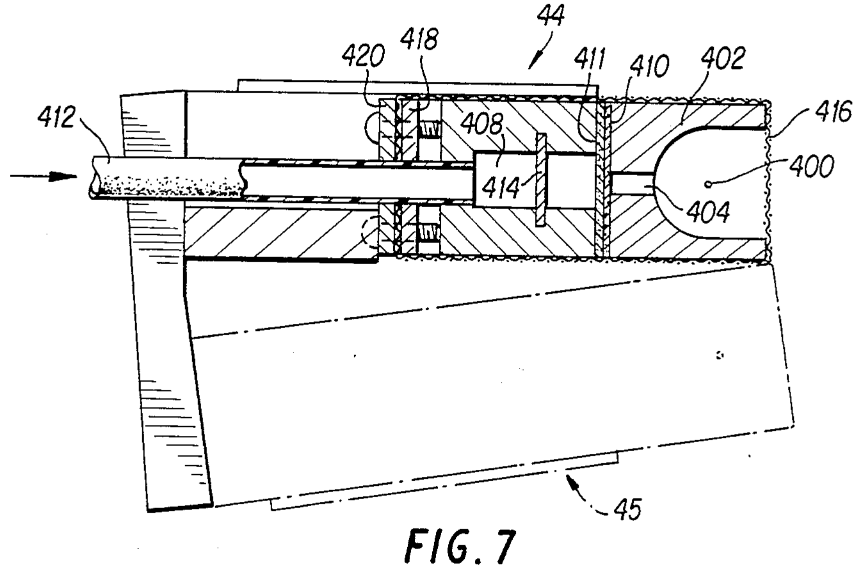
FIG. 7 is an enlarged sectional view of the corona neutralizer.

FIG. 6 is a perspective view of a corona neutralizer, with portions cut away to illustrate certain internal details. FIG. 7 is an enlarged sectional view of a corona neutralizer. The corona wire 400 is enclosed within an elongated conductive corona shield 402 which has a U-shaped cross-section and a series of holes 404 therethrough. The corona shield 402 is supported by a manifold block 406 which is formed with an oblong central cavity 408. A filter screen 410 is disposed between corona shield 402 and manifold block 406 over the entire length of the cavity 408. An air inlet tube 412 for supplying a flow of air to the corona neutralizer is connected with cavity 408. A solid diffuser disk 414 is nested within block 406 adjacent to filter screens 410, 411 opposite air inlet tube 412. An electrically grounded screen 416 is wrapped over the outside surfaces of the corona shield 402 and the manifold block 406. The two ends of screen 416 are secured between plates 418 and 420 in order to tighten the screen against the outside surfaces of the corona shield and manifold block. An identical corona neutralizer 45 is shown in phantom in FIG. 7 adjacent to corona neutralizer 44.

In operation, an AC potential is applied to the corona wire 400 so that both positive and negative ions are generated. Some of the negative ions are drawn through the screen 416 by the residual positive charges on the dielectric drum 34, and in this manner the drum surface is neutralized. The screen 416 is maintained at or near ground potential; as a result, the electric field existing between the screen and the drum surface will drop to zero when the drum surface has been completely neutralized, and the flow of negative ions toward the drum will cease. In general, the flow of ions between the corona wire 400 and the drum surface will cease when the potential of the drum surface becomes equal to the screen potential. When two corona neutralizers 44, 45 are used, as in th preferred embodiment, the screen potential of the first neutralizer may be made slightly negative in order to accelerate the rate of charge neutralization.

In accordance with the present invention, a flow of heated air is provided through the electrostatic print head 28 in order to inhibit the formation of ammonium nitrate in and around the apertures 96, 98 and on the corona wire 76, and through corona neutralizer unit 180 in order to inhibit the formation of ammonium nitrate on the corona wires and screen. In the absence of heated air, the components of the print head 28, including the corona wire 76, and the corona neutralizer unit 180 normally operate at or near ambient temperature.

Figure 8:
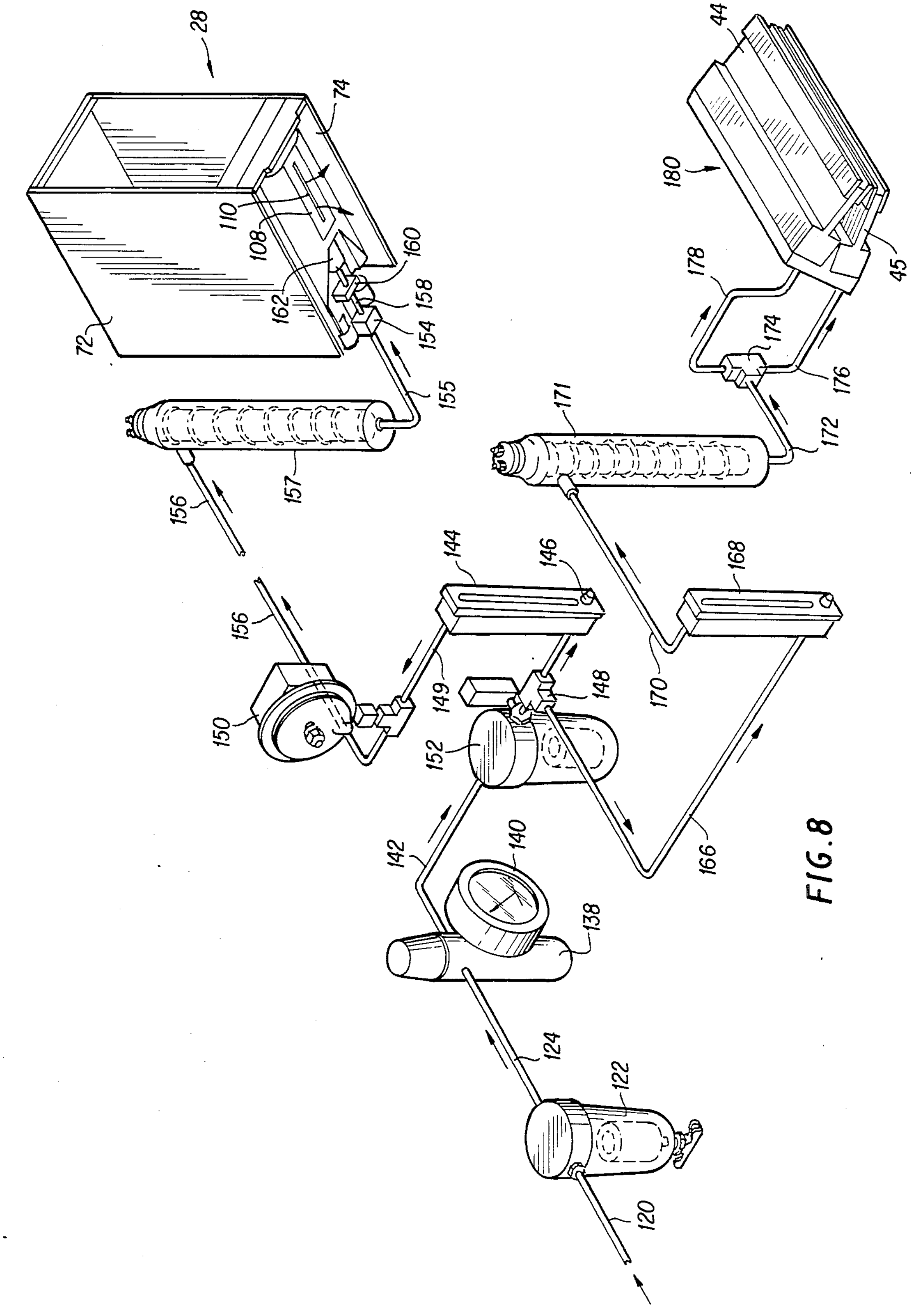
FIG. 8 illustrates the system which is used to supply heated air to the electrostatic print head and to the corona neutralizer.

An exemplary system for supplying heated air to the print head 28 and corona neutralizer unit 180 is illustrated in FIG. 8. Compressed air at a minimum of 80 psi and generally about 80–100 psi enters the system through a section of tubing 120 and is conducted to the input side of a coalescing oil filter 122. The coalescing oil filter operates to remove any oil or water droplets which may be present in the source of compressed air. The output side of the filter 122 is connected by means of a further length of tubing 124 to an output register 138 which controls the air pressure to the print head 28. A gage 140 allows the air pressure at the output of the regulator 138 to be monitored. From the output of the regulator 138, the air passes via tubing 142 to the input side of a hydrocarbon filter 152. The output side of the hydrocarbon filter 152 is connected via a short length of tubing to a tee 148, one output of which is connected to the input side of an adjustable flow meter 144 of the floating ball type. In the preferred embodiment, the flow meter 144 is set to provide an air flow of about 41 cubic feet per hour to the electrostatic print head 28. A knob 146 on the flow meter allows the flow rate of the air to be adjusted if necessary. The output side of the flow meter 144 is connected via tubing 149 to a pressure sensor 150. The function of the pressure sensor 150 is to insure that adequate air pressure is being provided to the print head 28, and to interrupt the operation of the machine when this condition is not satisfied. The output side of pressure sensor 150 is connected via tubing 156 to the input side of an air heater 157, such as Model No. PF06 manufactured by Hotwatt, Inc. of Danvers, Mass. The output side of air heater 157 is connected via a length of heat resistant tubing 155, such as metal or ceramic tubing, to disconnect coupling 154 which is connected to a rigid tube 158 carried by the print head 28. The tube 158 passes through a support member 160 and is connected to the input side of a particulate filter 162. Referring to FIG. 3, the output side of the filter 162 is connected to an aperture 164 located at one end of the oblong central cavity 82 in the frame 80. The aperture 164 delivers heated air into the enclosed chamber formed by the cavity 82, opening 86 and the cut-out 90 in the rear frame member 88. The heated air flows around the sides of the corona shield 78 and passes through the gap between the corona shield and the aperture mask 94 to the interior of the corona shield, where it surrounds the corona wire 76 in the course of passing out of the print head through the apertures 96, 98 and the slotted mask 108.

The second output of the tee 148 is connected via tubing 166 to the input side of an adjustable flow meter 168 of the floating ball type. Flow meter 168 is connected via tubing 170 to the input side of another air heater 171 similar to air heater 157. The output side of air heater 171 is connected via heat resistant tubing 172 to tee 174, which is connected via heat resistant tubing 176, 178 to corona neutralizer unit 180. Corona neutralizer unit 180 comprises two identical side-by-side corona neutralizers 44 and 45. Referring to FIG. 7, tubing 178 is connected to tubing 412 which delivers heated air into the enclosed cavity 408. The heated air flows around diffuser disk 44, through filter screens 410, 411 and through the series of holes 404 through corona shield 402, where it surrounds corona wire 400. The heated air then passes through screen 416 against the dielectric coating of drum 34.

The flow of heated air through the electrostatic print head 28 has been found to retard the buildup of ammonium nitrate on the corona wire 76, and in and around the electrically controlled apertures 96, 98, to a point where the useful life of the print head can be extended by an order of magnitude. This represents an enormous increase over the average lifetime of a print head not supplied with heated air, which is typically about 75 hours. The flow of heated air through the corona neutralizers, such as corona neutralizer 44, has been found to retard the buildup of ammonium nitrate on the corona wire 400 and screen 416. Although elevated temperatures may cause the corona wires to expand somewhat, this may be alleviated by the use of springs or other compensating means to support the corona wires.

The following examples, provided merely by way of illustration and not being intended as limitations on the scope of the invention, will assist in an understanding of the invention and the manner in which these advantageous results are obtained.

EXAMPLE 1

An apparatus was constructed which was capable of testing several print heads at the same time for the purpose of determining the lifetime of each print head. A power supply was wired in parallel to each print head with an LED indicator showing the power going to each print head. An hour meter was also attached to each print head to measure the head life.

Figure 9:
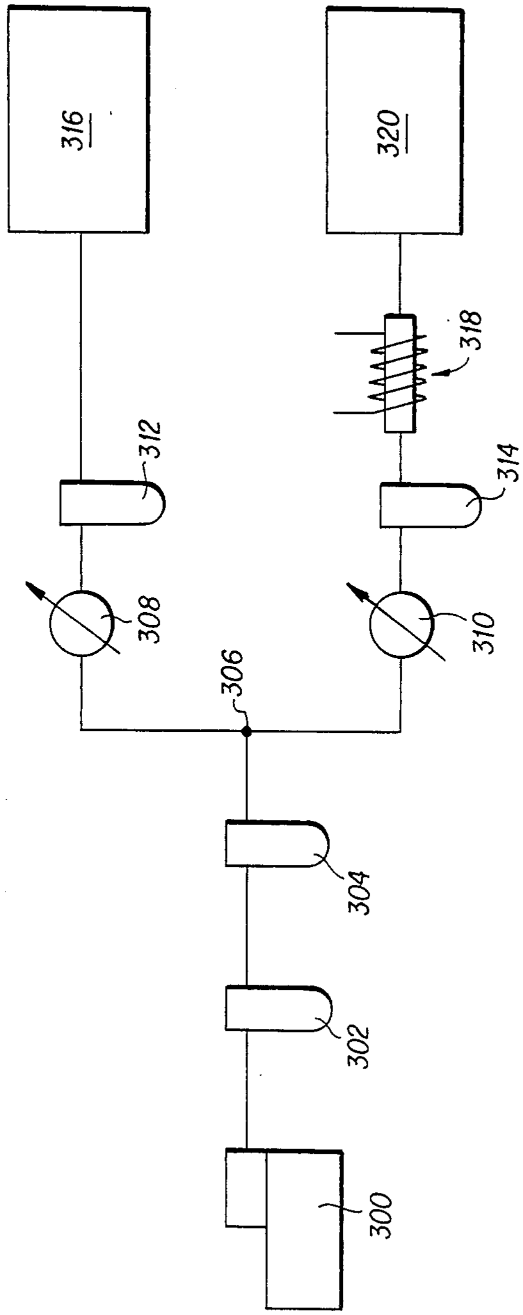
FIG. 9 is a schematic diagram of a test apparatus used to determine the effect of heated air on the lifetime of electrostatic print heads.
Figure 10:
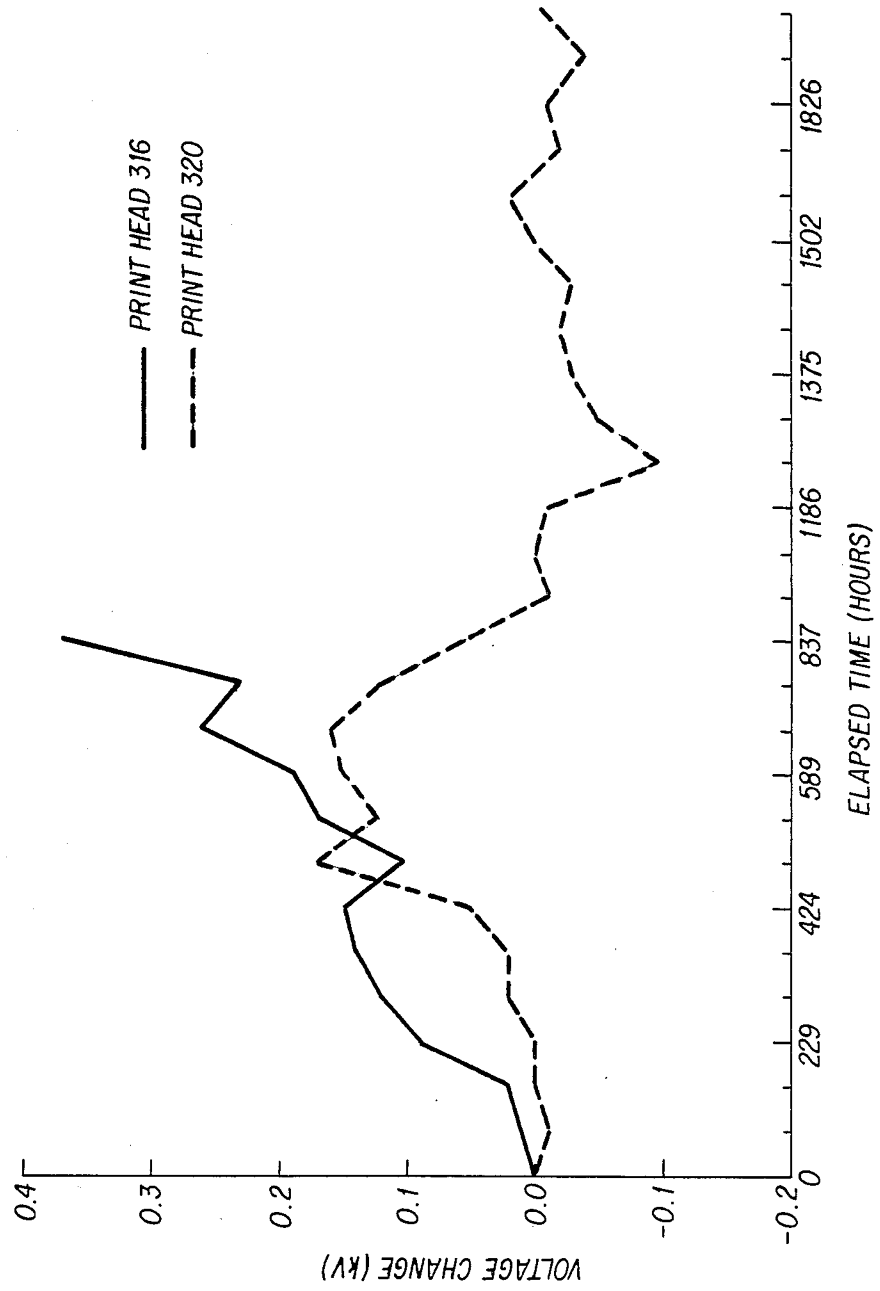
FIG. 10 is a plot of the change of corona kilovolts from the starting voltage versus elapsed hours based on the data presented in Example 1 below.
Figure 11:
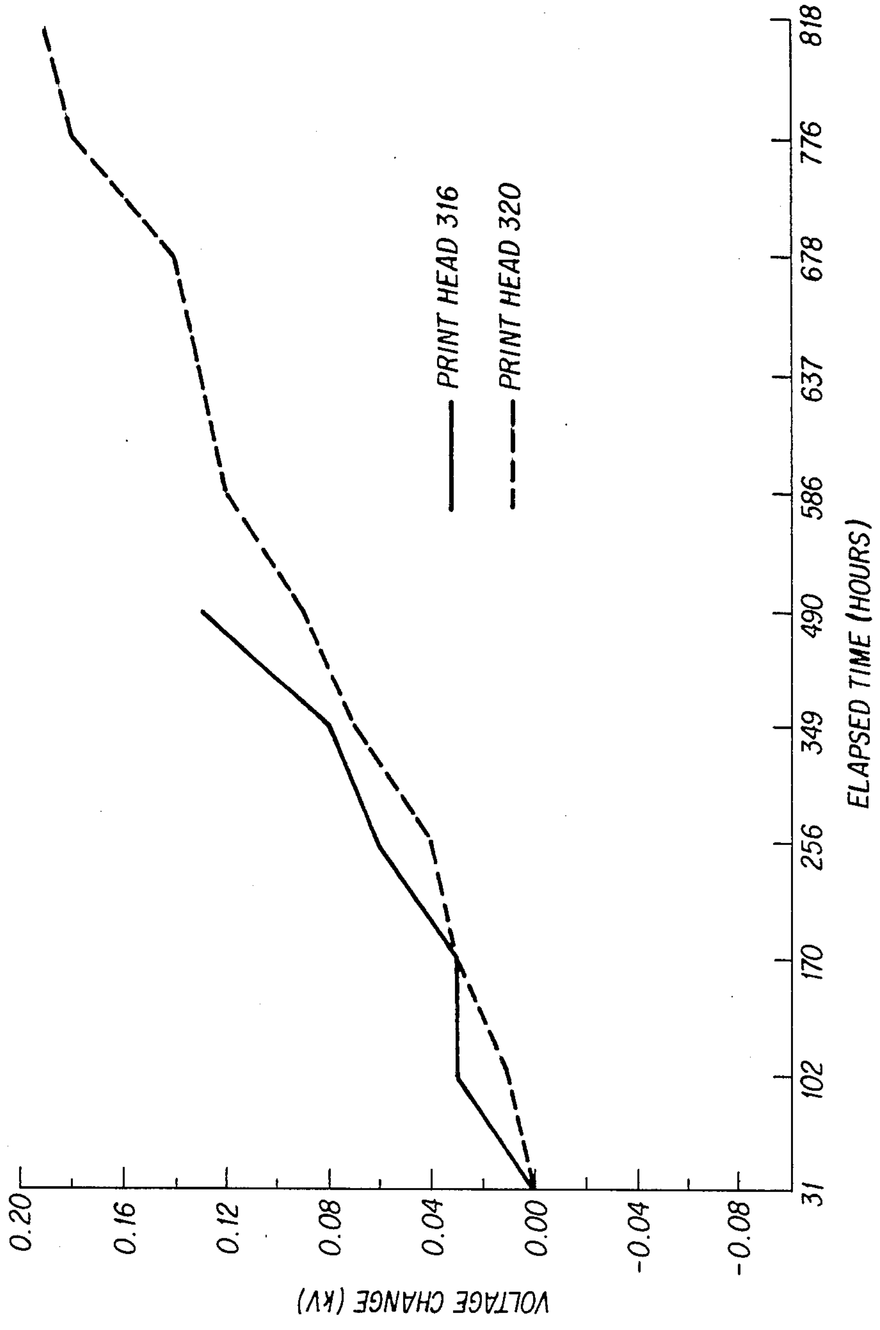
FIG. 11 is a plot of the change in corona kilovolts from the starting voltage versus elapsed hours based on the data presented in Example 2 below.

Two print heads were tested to measure the effect on lifetime of heating the air which is pumped through the apertures in the print heads. The two print heads used were of the type shown in FIG. 2. The testing apparatus which was used is shown schematically in FIG. 9. A Gast oilless pump (Type DOA-U111-AA), designated by the numeral 300, was connected by tubing to a Balston oil coalescing filter (Type 92 with DX filter) designated by the numeral 302. All tubing used to connect the components of the apparatus was ⅛ in. I.D. Bev-A-Line IV tubing. The oil coalescing filter 302 was connected to a Balston charcoal filter (Type 92 housing with CI-100-12 filter), designated by the numeral 304. The charcoal filter 304 was connected by a Tee joint 306 to two Dwyer flowmeters (Model RMA-8-SSV; 0–100 scfh), designated by the numerals 308 and 310. Each flowmeter was connected to a Balston DFU particulate filter, designated by the numerals 312 and 314. DFU filter 312 was connected directly to the plenum behind the corona shield on one of the print heads 316. The corona wire in the print head 316, which received unheated air, operated at or near ambient temperature. The other DFU filter 314 was connected to a heater 318 comprising a Nichrome wire wound around a ceramic tube. The heater was connected to the plenum behind the corona shield of the second print head 320. The heater was controlled by a proportional controller which maintained the air temperature at 180° F. (82° C.). The heater power was regulated to maintain the desired temperature by sensing the air temperature in the plenum behind the corona shield with a thermocouple located in the plenum.

The coronas were turned on and the air was allowed to equilibrate at 180° F. (82° C.). The air flow to each print head was 30 scfh. Ambient relative humidity during the test was above 40 percent on the average. The hours of operation, corona voltage and voltage change from the initial value during the test are set forth in Tables I and II below:

TABLE I

| Print Head 316 (Ambient Air) | | |
|---|---|---|
| Approximate Elapsed Time (hours) | Corona Voltage (KV) | Change from Starting Voltage (KV) |
| 0 | 2.70 | 0 |
| 90 | 2.71 | 0.01 |
| 134 | 2.72 | 0.02 |
| 229 | 2.79 | 0.09 |
| 269 | 2.82 | 0.12 |
| 382 | 2.84 | 0.14 |
| 424 | 2.85 | 0.15 |
| 520 | 2.80 | 0.10 |
| 545 | 2.87 | 0.17 |
| 589 | 2.89 | 0.19 |
| 656 | 2.96 | 0.26 |
| 672 | 2.93 | 0.23 |
| 837 | 3.07 | 0.37 |

TABLE II

| Print Head 320 (Heated Air) | | |
|---|---|---|
| Approximate Elapsed Time (hours) | Corona Voltage (KV) | Change from Starting Voltage (KV) |
| 0 | 2.48 | 0.00 |
| 90 | 2.47 | −0.01 |
| 134 | 2.48 | 0.00 |
| 229 | 2.48 | 0.00 |
| 269 | 2.50 | 0.02 |
| 382 | 2.50 | 0.02 |
| 424 | 2.53 | 0.05 |
| 520 | 2.65 | 0.17 |
| 545 | 2.60 | 0.12 |
| 589 | 2.63 | 0.15 |
| 656 | 2.64 | 0.16 |
| 672 | 2.60 | 0.12 |
| 837 | 2.53 | 0.05 |
| 1020 | 2.47 | −0.01 |
| 1138 | 2.48 | 0.00 |
| 1186 | 2.47 | −0.01 |
| 1234 | 2.38 | −0.10 |
| 1287 | 2.43 | −0.05 |
| 1375 | 2.45 | −0.03 |
| 1423 | 2.46 | −0.02 |
| 1452 | 2.45 | −0.03 |
| 1502 | 2.48 | 0.00 |
| 1596 | 2.50 | 0.02 |
| 1756 | 2.46 | −0.02 |
| 1826 | 2.47 | −0.01 |
| 1924 | 2.44 | −0.04 |
| 2062 | 2.47 | −0.01 |

After 229 hours of operation, the two print heads were examined. In print head 316 which used the ambient air, the corona shield exhibited whitish deposits of ammonium nitrate which extended the length of the apertures. The deposits were heavier toward the end farthest from the air inlet. The material appeared as a whitish haze on the shield. The corona wire was covered with a dark deposit which was irregular in places, having a flaky appearance. The dark deposit was opposite the conductive plane of the aperture mask, not the Kapton-insulated area. On the back of the print head there were heavy deposits of ammonium nitrate in the apertures at the ends of the print head. The apertures were clear in the center of the print head. There were no unusual deposits or changes on the front (outside) of the print head.

In print head 320 which used the heated air, the corona shield did not have any obvious deposit of material. The corona wire was golden in color and quite clean, with a small number of white needles growing axially out from the wire. On the back of the print head, the entire cavity was filled with very fine glass fibers from the thermocouple insulation. The apertures were free of ammonium nitrate deposits. There was some clear or golden deposits around the apertures, especially near the center of the print head. There were no unusual deposits on the outside of the print head. After 229 hours of operation, print head 320 with heated air was much cleaner than print head 316 with air at ambient temperature.

After 423 hours, print head 316 was examined and found to have continued accumulation of deposits on the corona shield and in the print head. After 424 hours, print head 320 was examined and was still observed to be much cleaner.

After 672 hours, print head 320 was examined. The corona wire was golden in color with some whiskers. The print head exhibited a light brown deposit along the row of apertures. The apertures were generally clear of ammonium nitrite. The corona shield was covered with a very light haze of ammonium nitrate.

After 837 hours, print head 320 was examined and found to be very similar to the last inspection. A slight haze of ammonium nitrate was visible on the shield.

After 840 hours, the corona on print head 316 would not turn back on and the print head was examinated. Print head 316 had reached the end of its life. Extensive deposits of ammonium nitrate were visible in the center portion of the corona shield with golden brown deposits on each end of the shield. There were white and green deposits on the inboard end of the print head. The center was relatively clean. There was an extensive brown deposit on the outboard end. The corona wire was dark. The printing performance of the print head would be unacceptable long before 840 hours.

After 1020 hours, print head 320 was examined. The appearance was still good and not substantially different from the previous inspection.

After 1234 hours, print head 320 was again examined. There were diffuse ammonium nitrate deposits on the corona shield. The corona wire was golden brown with whiskers. A brown conductive deposit was found on the print head. The apertures were clear. Ammonium nitrate was building up on the outside of the print head.

After 1502 hours, the appearance was much the same as it was after 1234 hours. The wire was golden in color with an increased number of whiskers. The apertures were clear on the inside with a diffuse haze on the corona shield.

After 1756 hours, print head 320 was again examined. The nitrate haze on the corona shield had become nonuniform, showing narrow bands of cleaner areas on the shield. These bands corresponded to the locations of several small dark areas on the wire. The appearance of the inside of the mask was generally clean with some brownish discoloration at either end.

After 2062 hours, print head 320 was again opened and examined. In addition, a print test was done.

At least 13 areas on the inside of the mask showed damage from arcing. At the corresponding location on the wire, scars from high voltage arcs were also visible. The corona shield retained the banded appearance.

The print quality after 2062 hours was poor. It was not appreciably improved by cleaning the mask with distilled water. Replacing the corona wire (along with water cleaning of the mask) did, however, restore the print quality to a very good condition.

The results of tests indicate that, at some time between 1756 hours and 2062 hours, the corona wire began to arc appreciably. It was observed that there was a gradual buildup of ammonium nitrate on the corona shield and in the form of whiskers on the corona wire. These areas of ammonium nitrate possibly provided points for the arcing to start. No evidence of deterioration of the mask itself was observed after 2000 hours at 180° F. (82° C.).

The ion generator described in these examples is of the current regulated type. The sum of the currents flowing from the corona wire 76 to the corona shield 78 and to the conductive layer 102 is regulated to a constant value. The voltage of the corona wire 76 is then allowed to reach a level to maintain this constant current. As the interior of the corona cavity becomes coated with ammonium nitrate and other materials, the voltage needed to maintain constant current must be increased. Therefore, the increase in the voltage of the corona wire as a life test proceeds is an indicator of the degree to which the corona cavity is being contaminated with ammonium nitrate or other materials. The data for the change in the voltage from the initial level for the print heads with ambient air and heated air versus elapsed time from Tables I and II, respectively, is graphically illustrated in FIG. 7.

EXAMPLE 2

A second test was conducted to determine the lifetime of a print head using air heated to a temperature of 160° F. (71° C.). The testing apparatus employed in Example 1 above was modified by adding a humidifier to the air pump intake. The relative humidity was maintained at about 40-50 percent. Print tests were made periodically. The air flow to each print head was 30 scfh. This test demonstrated that a print head which was run with ambient air suffered severe degradation of print quality between 300 and 490 hours, whereas a print head which was run with the same air heated to about 160° F. (71° C.) showed substantial degradation of print quality between 637 and 818 hours. The test further showed that print quality could be substantially restored by cleaning the mask with water and by replacing the corona wire.

In print head 316, which operated at or near ambient temperature, print quality had substantially degraded after only 101 hours. After 490 hours, the print quality from print head 316 was very bad.

In print head 320, which received the heated air, the print quality was quite consistent until 490 hours. By 637 hours, print quality from print head 320 was starting to degrade, and after 818 hours the print quality had degraded substantially. The corona wire quality had degraded to the point where its gold coating had disappeared. This corresponded to the areas of light print.

Print quality could be restored to the new state by cleaning the mask with water and replacement of the corona wire.

The hours of operation, corona voltage, voltage change from the initial value, and relative humidity during the test are set forth in Tables III and IV below:

TABLE III

| Print Head 316 (Ambient Air) | | | |
|---|---|---|---|
| Approximate Elapsed Time (hours) | Corona Voltage (KV) | Change from Starting Voltage (KV) | % RH |
| 31 | 2.70 | 0.00 | 70 |
| 102 | 2.73 | 0.03 | 45 |
| 170 | 2.73 | 0.03 | 48 |
| 257 | 2.76 | 0.06 | 45 |
| 349 | 2.78 | 0.08 | |
| 490 | 2.83 | 0.13 | 39 |

TABLE IV

| Print Head 320 (Heated Air) | | | |
|---|---|---|---|
| Approximate Elapsed Time (hours) | Corona Voltage (KV) | Change from Starting Voltage (KV) | % RH |
| 31 | 2.47 | 0.00 | 70 |
| 101 | 2.48 | 0.01 | 45 |
| 170 | 2.50 | 0.03 | 48 |
| 256 | 2.51 | 0.04 | 45 |
| 349 | 2.54 | 0.07 | |
| 490 | 2.56 | 0.09 | 39 |
| 586 | 2.59 | 0.12 | |
| 637 | 2.60 | 0.13 | 50 |
| 678 | 2.61 | 0.14 | 42 |
| 776 | 2.65 | 0.18 | 42 |
| 818 | 2.66 | 0.19 | |

The data for the change in the voltage from the initial level for the print heads with ambient air and heated air versus elapsed time from Tables III and IV, respectively, is graphically illustrated in FIG. 8.

What is claimed is:

1. An offset electrostatic printer comprising:

(a) an ion modulated electrostatic print head for forming latent electrostatic images, (b) a dielectric imaging member comprising a layer of dielectric material, (c) means for developing a latent electrostatic image on the dielectric imaging member, (d) means for transferring a developed electrostatic image from the dielectric imaging member to an image receiving surface, (e) means for supplying a heated air flow having a temperature in the range of from about 120° F. (49° C.) to about 200° F. (93° C.), and (f) means for directing the heated air flow at, near or through the print head and at or near the dielectric imaging member to reduce the accumulation of chemical deposits in the print head.

2. The offset electrostatic printer of claim 1 wherein the heated air flow supply means (e) is capable of supplying heated air having a temperature in the range of from about 140° F. (60° C.) to about 180° F. (82° C.).

3. The offset electrostatic printer of claim 1 wherein the dielectric imaging member comprises a layer of dielectric material on a conductive substrate.

4. The offset electrostatic printer of claim 1 wherein the print head comprises means for defining a plurality of selectively modulated beams of ions and an ion generator for providing ions, and wherein the heated air flows at or near the beams of ions and at or near the ion generator.

5. The offset electrostatic printer of claim 4 wherein the ion generator comprises a corona wire using a DC voltage source.

6. The offset electrostatic printer of claim 4 wherein the ion generator comprises a dielectric-coated conductor using an AC voltage source.

7. The offset electrostatic printer of claim 1 wherein the print head comprises a modulated aperture board having a plurality of selectively controlled apertures therein, and an ion generator for providing ions for electrostatic projection through the apertures, and wherein the flow of heated air is directed at or near the ion generator and at, near or through the apertures.

8. The offset electrostatic printer of claim 7 wherein the apertures function to selectively block or permit the flow of ions, and wherein the ion generator comprises a corona wire.

9. The offset electrostatic printer of claim 1 further comprising:

(g) an ion generator for erasing latent electrostatic images, and (h) means for directing the flow of heated air at or near the ion generator (g).

10. An offset electrostatic imaging process which comprises the steps of:

(a) forming a latent electrostatic image on a dielectric imaging member using an ion modulated electrostatic print head, (b) developing the latent electrostatic image, (c) transferring the developed electrostatic image from the dielectric imaging member to an image receiving surface, (d) providing a flow of heated air having a temperature in the range of from about 120° F. (49° C.) to about 200° F. (93° C.), and (e) directing the flow of heated air at, near or through the print head and at or near the dielectric imaging member to reduce the accumulation of chemical deposits in the print head.

11. The offset electrostatic imaging process of claim 10 wherein the heated air has a temperature in the range of from about 140° F. (60° C.) to about 180° F. (82° C.).

12. The offset electrostatic printing process of claim 10 wherein the print head comprises a modulated aperture board having a plurality of selectively controlled apertures therein, and an ion generator for providing ions for electrostatic projection through the apertures, and wherein the flow of heated air is directed at or near the ion generator and at, ner or through the apertures.

13. The offset electrostatic imaging process of claim 12 wherein the apertures function to selectively block or permit the flow of ions, and wherein the ion generator comprises a corona wire.

14. The offset electrostatic imaging process of claim 10 further comprising:

(f) erasing the latent electrostatic image by means of an ion generator, and (g) directing the flow of heated air at or near the ion generator in step (f).

* * * * *